(12) United States Patent
Montant et al.

(10) Patent No.: US 6,244,272 B1
(45) Date of Patent: Jun. 12, 2001

(54) MULTILAYER ASSEMBLY WITH A CENTRAL ELECTRICALLY CONDUCTIVE LAYER FOR USE AS AN INDUCTIVE SENSOR ELEMENT

(75) Inventors: Jean-Marc Montant, Montpellier; Jean-Luc Caminade, Saint Jean de Vedas, both of (FR)

(73) Assignee: Support Systems International Industries, Montpellier (FR)

( * ) Notice: Subject to any disclaimer, the term of this patent is extended or adjusted under 35 U.S.C. 154(b) by 0 days.

(21) Appl. No.: 09/230,210
(22) PCT Filed: Jul. 22, 1997
(86) PCT No.: PCT/FR97/01359
§ 371 Date: Jan. 21, 1999
§ 102(e) Date: Jan. 21, 1999
(87) PCT Pub. No.: WO98/03143
PCT Pub. Date: Jan. 29, 1998

Related U.S. Application Data

(63) Continuation of application No. 08/898,274, filed on Jul. 22, 1997, now abandoned.

(30) Foreign Application Priority Data

Jul. 24, 1996 (FR) .................................................. 96 09283

(51) Int. Cl.⁷ .................................................. A61B 19/00
(52) U.S. Cl. .......................................... 128/898; 128/845
(58) Field of Search ............................ 128/897–98, 845, 128/846, 870

(56) References Cited

U.S. PATENT DOCUMENTS

| | | |
|---|---|---|
| 4,009,312 | 2/1977 | Hayashi et al. . |
| 4,182,981 | 1/1980 | Shum et al. . |
| 4,662,521 | 5/1987 | Moretti . |
| 4,686,152 | 8/1987 | Matsubayashi et al. . |
| 4,734,303 | 3/1988 | Fujiwara et al. . |
| 4,781,958 | 11/1988 | Gilbert . |
| 4,873,737 | 10/1989 | Savenije . |
| 5,560,374 | 10/1996 | Viard . |
| 5,934,280 | 8/1999 | Viard et al. . |
| 5,944,066 | 8/1999 | Viard . |
| 5,947,168 | 9/1999 | Viard . |
| 6,009,580 | 1/2000 | Caminade et al. . |
| 6,034,526 | 3/2000 | Montant et al. . |
| 6,079,068 | 6/2000 | Viard . |

FOREIGN PATENT DOCUMENTS

| | | |
|---|---|---|
| 2 103 999 | 3/1983 | (GB) . |
| 2 221 035 | 1/1990 | (GB) . |
| 1 495 659 | 12/1997 | (GB) . |

*Primary Examiner*—John P. Lacyk
(74) *Attorney, Agent, or Firm*—Wolf, Greenfield & Sacks, P.C.

(57) ABSTRACT

A multilayer assembly including a flexible, electrically conductive active central layer (532) with to main surfaces with a large area, i.e. a first surface adhered to at least one advantageously electrically insulating supporting layer (510) made of synthetic material and having substantially the same modulus of elasticity as the active central layer (532); and a second surface adhered to at least one advantageously electrically insulating second protective layer (520) made of synthetic material. The total thickness of the multilayer assembly is selected in such a way that the flexibility of the central adhesive layer (532) is substantially completely maintained. Said multilayer assembly may be used to treat or prevent bedsores.

41 Claims, 2 Drawing Sheets

Figure 1:
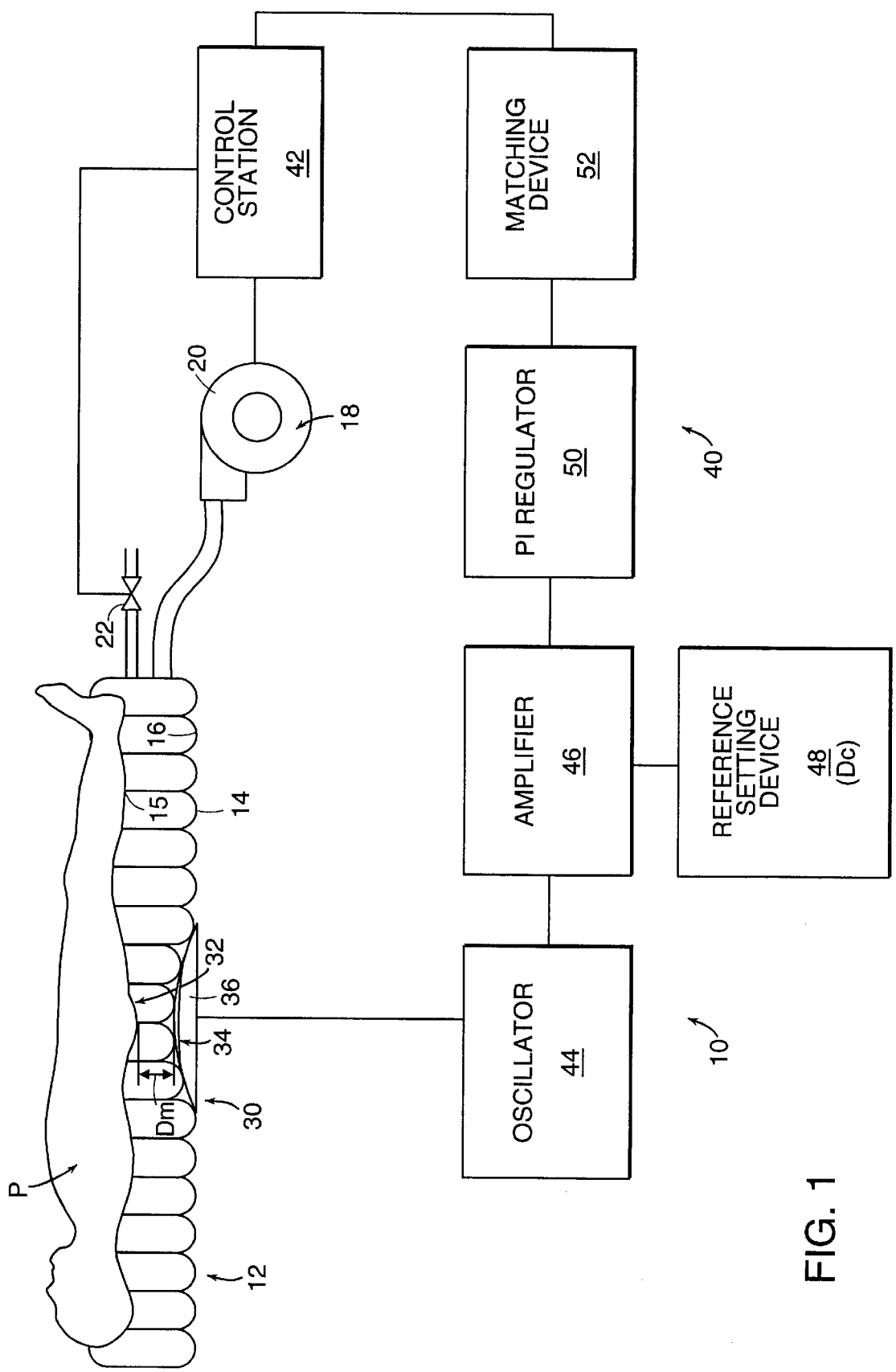

MULTILAYER ASSEMBLY WITH A CENTRAL ELECTRICALLY CONDUCTIVE LAYER FOR USE AS AN INDUCTIVE SENSOR ELEMENT

CROSS-REFERENCE TO RELATED APPLICATION

This application is a national stage of PCT/FR97/01359 filed Jul. 22, 1997 and a continuation of U.S. patent application Ser. No. 08/898,274 filed on Jul. 22, 1997, now ABN.

The present invention essentially relates to a multi-layer product having an electrically conductive central layer that can be used as an inductive sensor element. More particularly, the invention relates to a multi-layer product including an electrically conductive central layer that can be used as an inductive sensor element in the context of a method and a device for improving support of a patient, in particular for treating or preventing bedsores.

Documents U.S. Pat. Nos. 4,886,152; 4,009,312; 4,734,303; GB-A-2,103,999 and GB-A-1,495,659 all relate to multi-layers metallic foils as packaging materials.

Document EP-A-0 218 301 discloses a method and a device for improving support of a patient, which support comprises a mattress provided with one or more closed chambers filled with a fluid under a controlled filling pressure, and uses a measurement device based on a combination of two induction coils 24, 25 shown in FIG. 4. That device is not very satisfactory because it requires provision to be made to power both induction coils, i.e. including the moving induction coil which is disposed close to the patient, and that always poses a safety problem.

In Document FR-A-2 718 347 =EP-A-676 158, which corresponds to U.S. Pat. No. 5,560,374, the applicant discloses a method and apparatus for supporting an element to be supported, in particular the body of a patient, making it possible to support the element at an essentially constant controlled penetration depth by means of a measurement device comprising an induction system combined with a piece of metal foil situated under the body being supported. Displacement of the metal foil modifies the self-induction coefficient of the induction coil, shifting the resonant frequency of the LC circuit away from the tuning frequency of the oscillator, thereby damping the signal delivered to an amplifier by the oscillator, so as to ensure that the signal is correctly processed and appropriately monitored.

It should be noted that the piece of metal foil situated under the body being supported is generally arranged in the vicinity of that region of the element being supported which has the largest mass or which is most protuberant, generally the sacral region which constitutes the lowest position of the element being supported, e.g. the body of a patient.

In the context of the applicant's prior solution, the metal foil is situated very close to the element being supported, e.g. a patient, and it suffers from the drawback of being noticeable to the element being supported.

Furthermore, the metal foil must not give rise to any adverse physical phenomenon on the element being supported, especially when said element is a patient. Likewise the metal foil must not disturb the treatment of the patient.

Therefore, a main object of the present invention is to solve the new technical problem consisting in providing a solution making it possible to support an element to be supported, in particular the body of a patient, while using a measurement device for measuring the penetration depth to which the element being supported penetrates into the support element, without it being noticed by the element being supported, in particular by a patient, and without giving rise to disturbances or physical phenomena that might have adverse effects on the element being supported, in particular a patient, since any adverse effect on the treatment of a patient is unacceptable.

Another main object of the present invention is to solve the new technical problem consisting in providing a solution making it possible to support an element to be supported, such as the body of a patient, while using a measurement device for measuring the penetration depth to which the element being supported penetrates into the support element, which measurement device is flexible enough to change shape to fit the morphology of the element being supported, in particular the morphology of the body of a patient.

Yet another main object of the present invention is to solve the new technical problem consisting in providing a solution that makes it possible to support an element to be supported while using a measurement device for measuring the penetration depth to which the element being supported penetrates into the support element, which measurement device uses a piece of metal foil designed so as to have very good flexibility as well as very good mechanical strength, and in particular resistance to degradation of its electrical characteristics.

All of these technical problems are solved for the first time by the present invention in a way that is simple, cheap, safe and reliable, and that can be used on an industrial and medical scale.

In a first aspect, the present invention provides the use of a multi-layer film product, characterized in that it comprises an electrically conductive flexible active central layer comprising two main faces of large area, a first face glued onto at least one "support" layer of a synthetic material that is advantageously electrically insulating, and that has a coefficient of elasticity substantially similar to that of the active central layer, and a second face glued onto at least one "protective" second layer, in particular for protecting against abrasion, and made of a synthetic material that is advantageously electrically insulating, the total thickness of the multi-layer film product being chosen so that the flexibility of the active central layer is retained substantially completely, as an inductive sensor element or in a measurement device for measuring the penetration depth of an element being supported, in particular the body of a patient, which penetrates in a support device, for instance a mattress or the like, preferably the protective layer being located in front of said element being supported, for instance the body of a patient. The invention also relates to a multi-layer film product as previously defined but wherein the active central layer is of a size smaller than the support layer and the protective layer. Therefore, the central layer does not have any edge liable to be apparent or in contact with the outside. For instance, the size of the central layer is of the order of 600 mm fold 600 mm and the size of the support layer is in the order of 725 to 975 mm fold 1100 to 1400 mm and the size of the protective layer is of the order of 700 mm fold 1000 mm.

In the context of the present description and of the claims, the term "flexible active central layer" indicates that the central layer has a folding flexibility in a direction perpendicular to the layer over its main faces of large area, thereby enabling it to change shape to fit the morphology of the element being supported, in particular the morphology of the body of a patient. Likewise, in the present description and in the claims, it is to be understood by the term "electrically conductive active central layer" that the central layer conducts electricity regardless of how it is implemented. Advantageously, the thickness of the electrically conductive flexible central layer is at least 15 μm.

In an advantageous embodiment, the thickness of the electrically conductive flexible central layer lies in the range 20 μm to 40 μm approximately, or better still in the range 25 μm to 35 μm approximately, in particular approximately 30 μm.

In another advantageous embodiment of the invention, the thickness of the support layer lies in the range 10 μm to 15 μm approximately. Preferably, the support layer contains or is made of polyester.

In an advantageous embodiment, the support layer is metal plated over at least one face that is to be arranged facing the electrically conductive central layer. Preferably, the metal plating of the support layer is implemented using a metal or a metal alloy compatible with a metal or metal alloy making the active central layer electrically conductive.

In a currently preferred embodiment, the electrically conductive active central layer contains or is constituted by at least one piece of aluminum foil which may be about 30 μm thick. In which case, it is currently desirable for the metal plating of the support layer to be implemented with a metal or a metal alloy chosen from silver, aluminum, or a combination of the two. The thickness of the metal plating is not critical but its function is to provide a good link between the support layer and the active central layer. The thickness of the metal plating is generally about 1 μm or a few microns.

In another variant of the embodiment, the thickness of the "protective" layer may advantageously lie in the range 20 μm to 40 μm approximately, or better still in the range 20 μm to 30 μm approximately. The protective layer may contain or be made of polyester. In which case, the thickness of the protective layer is also about 25 μm.

According to another advantageous characteristic of the invention, the layers are stuck together with an adhesive having a bonding force that imparts sufficiently long-lasting mechanical strength to the multi-layer product for it to be unnecessary to change the multi-layer product while the element to be supported is on the support, in particular so as not to require a change to be made while a patient is being treated on a bed. Preferably, the adhesive used must advantageously impart an adhesion capacity that makes it impossible to unstick the layers without tearing them. Numerous adhesives having such a capacity are commercially available. An adhesive of the acrylic type is currently preferred.

In the context of the invention, it is also advantageous for the adhesive to be pre-applied, e.g. on one face of the active layer and on one face of the protective layer, so as to make the layers easier to assemble together.

In which case, the method of manufacturing the multi-layer product is particularly simple, and it merely consists in gluing the active central layer as pre-provided with adhesive onto the support layer, and in gluing the protective layer having a face pre-provided with adhesive onto the remaining other face of the active central layer by exerting a bonding pressure dependent on the adhesive used, and by allowing the adhesive to take for a sufficient period of time, generally recommended by the manufacturer of the adhesive. It is advantageous to use layers having the dimensions required for the multi-layer product so as to avoid any subsequent cutting.

A multi-layer product is thus obtained that can constitute an inductive sensor element, and the multi-layer product can also be used to constitute one of the elements of a measurement device for measuring the penetration distance to which an element being supported, e.g. the body of a patient, penetrates into a support device, e.g. a mattress, this currently constituting the preferred application of the invention.

In a second aspect, the present invention also provides an inductive sensor element, characterized in that it comprises a multi-layer film product as defined above.

In a third aspect, the present invention also provides a measurement device for measuring the penetration depth to which an element being supported, in particular the body of a patient, penetrates into a support device, e.g. a mattress or the like, in particular a support device comprising at least one closed or controlled-release chamber that is flexible and that is inflatable under an adjustable predetermined initial inflation pressure.

Advantageously, said chamber comprises a top face and a bottom face, said multi-layer film product being linked to the top face of said chamber and a displacement distance measuring device being linked to the bottom face of said chamber.

In a fifth aspect, the present invention also provides a method and an apparatus for preventing or treating bedsores, comprising a multi-layer film product as defined above.

Figure 2:
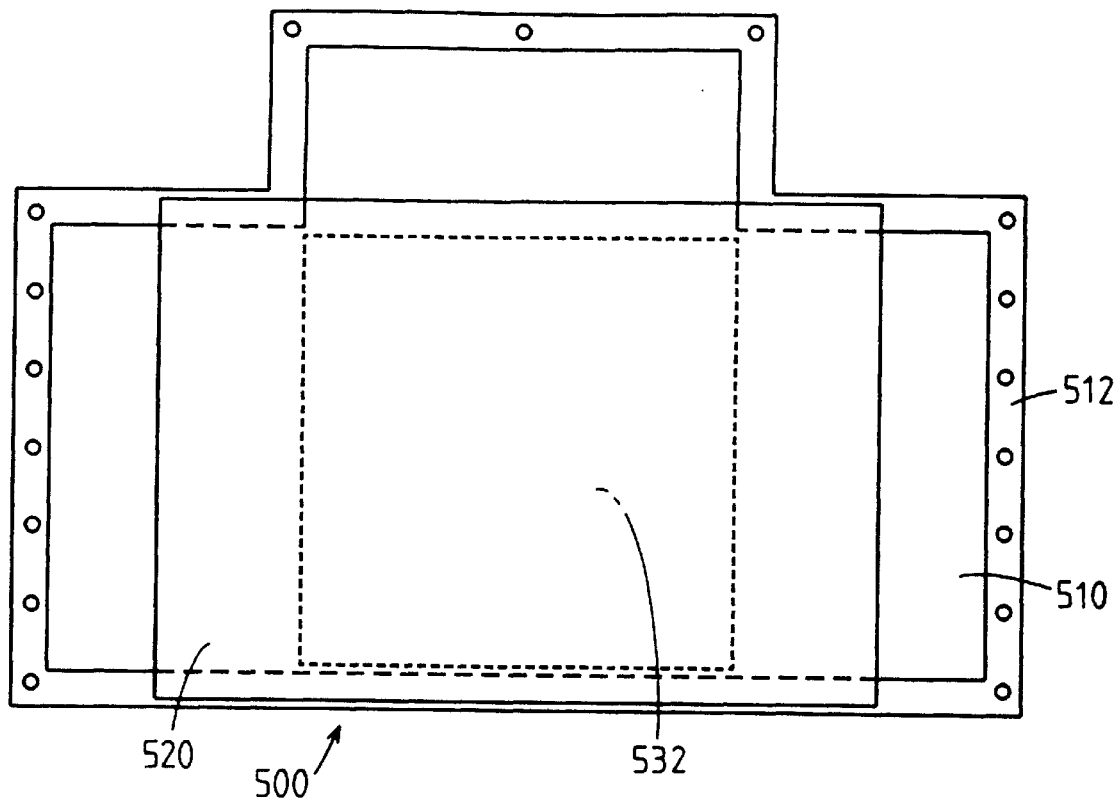
Figure 3:
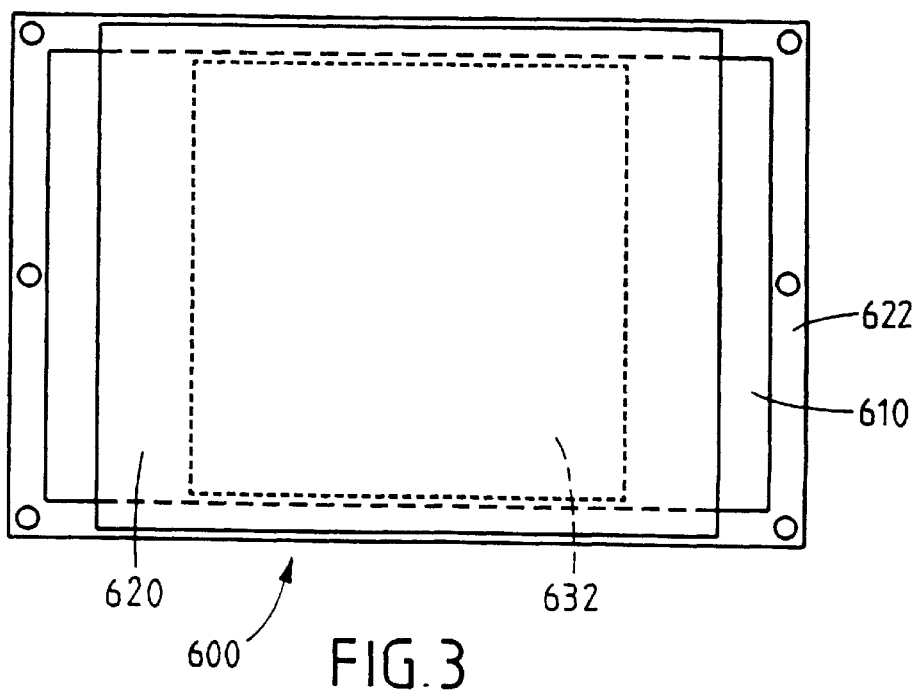

In the context of this fifth aspect, the present invention provides in particular a support apparatus for supporting an element to be supported, in particular a patient P, comprising a measurement device for measuring the positioning of a supported element by a flexible support device and a correlated deformation of said flexible support device resulting from the action of said element to be supported acting on said support device in relationship with the volume and shape of said supported element, said measurement device comprising a flexible, supple sheet or film of a metallic thin foil, displaceable and deformable in space submitted to a displacement and a deformation to be measured, in relationship with the movement and the deformation of the flexible support device, caused by said supported element, characterized in that said flexible supple sheet or film of said metallic thin foil comprises or is constituted of a multi-layer product as previously defined or as defined in the following description in relationship with FIGS. 2 and 3. When the element to be supported is preferably a patient, the deformable support device is in general a mattress.

According to an advantageous invention feature, said deformable support device further generally comprises at least one closed chamber inflated or deflated by feeding in or releasing a fluid, for instance air, comprising an upper face and a lower face, said deformable flexible sheet of a metallic thin foil being linked to the upper face of said chamber and a measuring element, preferably an impedance varying element, being linked to the lower face of said chamber. Said impedance varying element is preferably an induction coil.

According to a further particular advantageous invention embodiment, said apparatus further comprises control means acting on servo control means for servo controlling the inflation pressure of said chamber to maintain, while the element is being supported, a measured position separating the upper face from the lower face of said chamber preferably at a predetermined distance value, for instance substantially constant, namely substantially equal to or within an acceptable variation, with respect to a reference distance $D_c$. Here, the position represents the measured distance separating the closest point of the thin metallic foil linked to the upper face of the chamber, with respect to the lower face.

According to an advantageous variant embodiment, the control means comprise a control station comprising an electronic or electromechanical central processing unit having a memory which unit continuously or intermittently receives signals that are proportional to the value of the measured position Dm, transmitted by the measurement device and compares the measured values Dm with the reference distance value Dc, said control station further controlling servo control means for servo controlling the inflation pressure of the chamber to obtain permanently a measured position Dm essentially equal to the reference distance Dc or within an acceptable range of variation thereof.

According to a most preferred embodiment, the support device is a bedsore mattress.

Other objects, characteristics and advantages of the invention will appear clearly on reading the following explanatory description made with reference to two currently preferred embodiments of the invention given by way of illustration and therefore in no way limiting the scope of the invention. In the drawings:

FIG. 1 is a diagrammatic view of an embodiment of support apparatus as described in FIG. 2 of the assignee's prior document: FR-A-2 718 347=EP-A-0 676 158; which corresponds to U.S. Pat. No. 5,560,374; and FIG. 2 shows the first embodiment of a multi-layer product of the invention having an electrically conductive flexible active central layer, shown in dashed lines, e.g. usable for a support device having a single chamber; and FIG. 3 shows a second embodiment of a multi-layer product of the invention, usable with a support element having at least one chamber.

FIG. 1 shows prior art support apparatus as described in Document FR-A-2 718 347=EP-A-0 676 158, which corresponds to U.S. Pat. No. 5,560,374, and given the overall reference 10. This support apparatus makes it possible to support an element, in particular the body of a patient P, as shown.

The apparatus 10 includes a support device proper 12, e.g. a mattress, comprising at least one closed or controlled-release chamber 14 that is flexible and inflatable. For example, the chamber may be composed of a multitude of inflatable tubes that communicate with one another, said chamber 14 being inflatable under an adjustable predetermined initial inflation pressure. The chamber 14 has a top face 15 serving to support the element to be supported P, and a bottom face 16 which may, for example, rest on a base (not shown) or on equivalent means. The apparatus further includes servo-control means 18 for servo-controlling the pressure at which the chamber 14 is filled as a function of the distance to which the element being supported penetrates into the support device. For example, said servo-control means may comprise filling means 20, such as pumping means 20 for pumping a filling fluid into the chamber 14, such as a gas, in particular air, or a liquid, in particular water, and they may include emptying means such as a valve 22.

The apparatus also includes measurement means 30 for measuring the distance D between the top face 15 of the chamber and its bottom face 16.

The measurement means 30 may include a metal element 32, advantageously in the form of a piece of thin foil, secured to the top face 15 of the chamber 14, in this example inside said chamber 14, and cooperating with at least one inductive element 34 forming a position detector secured to the bottom face 16 of said chamber 14, which inductive element may be arranged inside the chamber, integrated into the bottom face of the chamber 14, or else it may be secured to the outside of the bottom face 16 of the chamber 14, as shown.

The apparatus also includes control means 40 that act on the servo-control means 18 for servo-controlling the inflation pressure of the chamber 14 to ensure that, while the element is being supported, the distance D as measured between the top face 15 and the bottom face 16 of the chamber 14 is kept preferably at a predetermined distance value, e.g. an essentially constant value, i.e. a value essentially equal to a reference distance $D_c$, or within an acceptable range of variation thereabout.

The control means 40 may advantageously include a control station 42 comprising an electronic or an electromechanical central processing unit having a memory, which unit continuously or intermittently receives signals that are proportional to the measured distance value $D_m$ as transmitted by the above-mentioned measurement means 30, and compares the measured distance values $D_m$ with the reference distance value $D_c$. The control station 42 controls the servo-control means 20, 22 for servo-controlling the inflation pressure of the chamber 14 so that a measured distance $D_m$ is obtained that is essentially constantly equal to the reference distance $D_c$ or within an acceptable range of variation thereabout.

The control means 40 are described in detail in the applicant's previous document FR-A-2 718 347=EP-A-0 676 158 in the description relating to FIGS. 1 to 4 and FIG. 6 thereof. EP-A-0 676 158 corresponds to U.S. Pat. No. 5,560,374, which is hereby incorporated by reference.

The control means 40 may include an oscillator device 44 which is shown in detail in FIG. 3 of FR-A-2 718 347=EP-A-0 676 158which corresponds to U.S. Pat. No. 5,560,374; and which is coupled to the inductive element 34, such as an induction coil, an amplifier device 46 whose gain may be adjusted by a reference setting device 48 defining the reference distance $D_c$. The amplifier 46 is then coupled to a proportional-plus-integral, regulator device 50 coupled to a matching device 52 whose output is coupled to the control station 42.

In the embodiment shown in FIG. 1, the inductive element 34, such as an induction coil, is, for example, arranged on a reinforcing member 36 positioned in the vicinity of that region of the element being supported P which has the largest mass or which is most protuberant, namely the sacral region of the patient P in this example, as explained in the applicant's above-mentioned prior document.

In the context of the applicant's prior document, the metal foil 32 has a thickness of 10 μm, and is arranged between two insulating films so as to increase sensitivity, see page 9, lines 26 to 30 in FR-A-2 718 347, which corresponds to U.S. Pat. No. 5,560,374, which was satisfactory.

However, in the context of the present invention, the inventors set themselves the technical problem of providing a solution making it possible to avoid or to minimize perception of the presence of the metal foil by an element being supported, in particular a patient.

Also in the context of the present invention, the inventors set themselves the new technical problem of avoiding any physical disturbance that might be caused by the metal foil to the element being supported, in particular when the element is a patient undergoing treatment.

Furthermore, in the context of the present invention, the inventors set themselves the new technical problem of providing a solution making it possible to make the metal foil very flexible, while greatly improving its mechanical strength, and while also preventing it from deteriorating while it is operating.

All of these technical problems are solved for the first time in a simple, safe, and reliable way by the present invention, as illustrated by the two currently preferred embodiments of the invention described with reference respectively to FIGS. 2 and 3.

With reference to FIG. 2, the novel product of the invention concerns a multi-layer product given the overall reference 500. This multi-layer product 500 is characterized in that it comprises:

a flexible active central layer 532 which has the same function as the metal element 32 in the form of a piece of metal foil and described in the applicant's prior document in particular with reference to FIGS. 1 and 2; the active central layer 532 is therefore electrically conductive, and, for example, it may be constituted by a piece of metal foil which, in the context of the present invention, has a thickness of at least 15 μm, defining two main faces of large area, as is easily understandable since it is implemented in the form of a piece of foil, namely a first face glued onto at least one "support" layer 510 of an electrically insulating synthetic material, shown larger in this example, and advantageously having a coefficient of elasticity substantially similar to the coefficient of elasticity of the active central layer 532, and a second face glued onto at least one "protective" second layer 520, in particular for protecting against abrasion, and made of a an electrically insulating synthetic material, the total thickness of the multi-layer product being chosen so that the flexibility of the active central layer 532 is retained substantially completely. Advantageously, the "protective" second layer also has a coefficient of elasticity that is substantially similar to that of the active central layer 532.

Advantageously, the thickness of the active central layer 532 lies in the range 20 μm to 40 μm approximately, or better still in the range 25 μm to 35 μm approximately.

A currently preferred embodiment of the active central layer is a piece of aluminum foil, in which case the currently ideal thickness is about 30 μm.

In another advantageous variant of the invention, the thickness of the support layer 510 lies in the range 10 μm to 15 μm approximately.

In a currently preferred embodiment, the support layer 510 comprises or is made of polyester.

In another advantageous variant embodiment of the invention, the support layer 510 may be metal plated over at least one face that is to be arranged facing the central layer 532. The metal plating of the support layer 510 is advantageously implemented using a metal or a metal alloy compatible with the metal used to make the central layer 532 electrically conductive. When the central layer 532 is made of aluminum, the support layer 510 is advantageously metal plated with a metal or a metal alloy chosen from silver and aluminum, or from a combination of the two.

In another advantageous variant embodiment of the invention, the thickness of the protective layer 520 lies in the range 20 μm to 40 μm approximately, or better still in the range 20 μm to 30 μm approximately.

In another advantageous variant embodiment, the protective layer comprises or is made of polyester, and its thickness is then currently ideally about 25 μm.

According to another advantageous characteristic of the invention, the active central layer 532 is glued to the support layer 510 and to the protective layer 520 by means of an adhesive having a bonding force that imparts high mechanical strength to the multi-layer product. Preferably, the adhesive has an adhesion capacity that makes it impossible to unstick the central layer 532 without tearing it. Numerous adhesives are commercially available, and an adhesive of the acrylic type is currently preferred.

In an advantageous embodiment, the active central layer 532 is pre-provided with adhesive, as is the protective layer 520, thereby facilitating gluing together the three layers, and manufacturing the multi-layer product.

For example, the size of the multi-layer product may be as follows: the size of the central layer 532 may be 600 mm ×600 mm and it may be constituted by a piece of aluminum foil that is about 30 μm thick; the support layer 510 may be made of polyester and have a size of 1,400 mm ×975 mm, and a thickness of 13 xm, the support layer being organized to be positioned remote from the element being supported, such as the body of the patient, e.g. at the most suitable place along the support element 12 shown in FIG. 1, e.g. the region generally corresponding to the sacral region; the protective layer 520, e.g. made of polyester, may have a size of 1,000 mm×700 mm, and a thickness of 25 μm, and be organized so as to be positioned facing the element being supported, e.g. the body of a patient P in this example. Naturally, these sizes are given merely by way of illustration.

The multi-layer product may be combined with an adhesive tape 512 which makes it possible to secure the multi-layer product with the protective layer facing the element being supported, such as the body of a patient P, at the desired place along the support element 12 shown in FIG. 1.

The multi-layer product of the present invention can thus be used as an inductive sensor element having the function of the sensor 32 in the method and apparatus described in the applicant's prior document with reference to FIG. 1; and it can also be used as one of the components of a measurement device such as the measurement device 34 described in the assignee's prior document, and with reference to FIG. 1 and therefore fully applicable to the present invention.

A second embodiment of a multi-layer product of the present invention is shown in FIG. 3. The identical elements have the same reference numbers plus 100. For example, the flexible active central layer has the reference number 632, the support layer has the reference number 610, and the protective layer has the reference number 620. For example, the active central layer 632 may be a piece of aluminum foil of size 600 mm×600 mm and of thickness 30 μm, i.e. its dimensions are unchanged; the support layer 610 may be a layer of polyester e.g. about 13 μm thick and metal plated over the face facing the metal layer 632 with silver, of size 1,100 mm×725 mm; and the protective layer 620 may be made of polyester, have a thickness of 25 μm, and a size of 1,000 mm×700 mm. Similarly, an adhesive tape 612 may be provided to bond the support element 12 to the multi-layer product 600 with the protective layer 620 facing the element being supported, such as the body of a patient P.

By means of the multi-layer product of the present invention, all of the above-mentioned technical problems are solved. In particular, the active central layer is protected well. Furthermore, the patient generally no longer notices the existence of the metal element forming the induction sensor. The flexibility of the multi-layer product enables it to fit perfectly the morphology of the element being supported, in particular the body of a patient. The multi-layer product is thus very flexible and very strong mechanically, in particular it has very good resistance to deterioration while it is operating. There is almost no possibility of the multi-layer product being delaminated while it is in normal use, thereby removing any risk of abrasion or deterioration of the active portion. Furthermore, by means of the metal plating of the support layer, expected behavior is obtained from the inductive sensor element with a better electromagnetic compatibility in terms of radiation immunity.

The invention thus offers a decisive advantage in the context of measurement devices for measuring the penetration depth to which an element being supported, such as the body of a patient P, penetrates into a support element 12, such as a mattress having at least one flexible chamber inflatable to an adjustable predetermined inflation pressure, as a person skilled in the art can well understand from the description of the present invention, and with reference to the applicant's previous document FR-A-2 718 347=EP-A-676 158, which corresponds to U.S. No. 5,560,374.

Naturally, the invention covers any characteristic which appears to be novel compared with any state of the art. Furthermore, the invention covers any means constituting techniques that are equivalent to the means described and shown. In addition, FIGS. 2 and 3 form an integral part of the present invention and therefore of the present description.

What is claimed is:

1. An apparatus for supporting a patient having a position measuring device, including an impedance varying element and a multilayer, flexible film of a thin metal foil movable and deformable in space that cooperates with said impedance varying element, said flexible film comprising:
    an electrically conductive, flexible, active, central layer having a coefficient of elasticity, a flexibility, and two main faces of large area, a first face and a second face;
    at least one support layer formed of a synthetic material that is electrically insulating, and that has a coefficient of elasticity substantially similar to the coefficient of elasticity of the active central layer, the support layer being linked to the first face of the central layer; and
    at least one protective second layer, formed of an electrically insulating synthetic material, the second layer being linked to the second face of the central layer, the total thickness of the multi-layer film being predetermined to retain substantially completely the flexibility of the central layer.

2. The apparatus according to claim 1, wherein a thickness of the central layer is between about 10 $\mu$m and 40 $\mu$m.

3. The apparatus according to claim 1, wherein a thickness of the support layer is between about 10 $\mu$m and 15 $\mu$m.

4. The apparatus according to claim 1, wherein the support layer comprises polyester.

5. The apparatus according to claim 1, wherein the support layer comprises metal plating over at least one face of the support layer facing the central layer.

6. The apparatus according to claim 5, wherein the metal plating of the support layer comprises a metal or a metal alloy compatible with a metal of the central layer.

7. The apparatus according to claim 5, wherein the central layer comprises a flexible film of foil made of aluminum or of an aluminum alloy, and the metal plating of the support layer comprises a metal or a metal alloy selected from the group consisting of silver, aluminum and a combination of silver and aluminum.

8. The apparatus according to claim 1, wherein a thickness of the protective second layer is between about 20 $\mu$m and 40 $\mu$m.

9. The apparatus according to claim 1, wherein the protective layer comprises polyester.

10. The apparatus according to claim 1, wherein said central layer is linked with said support layer and said protective layer by an adhesive having a bonding force of a high mechanical strength and an adhesion capacity that impedes unsticking of the multi-layer product without tearing the central layer.

11. The apparatus according to claim 10, wherein said adhesive is an acrylic adhesive.

12. The apparatus according to claim 1, wherein said supporting apparatus comprises a mattress having at least one closed chamber inflatable with a fluid, said chamber having a top face and a bottom face, said flexible film being linked to the top face of said chamber, and cooperating with said at least one impedance varying element linked to the bottom face of said chamber, and wherein said supporting apparatus further comprises control means acting on servo control means for servo controlling an inflation pressure of said chamber to maintain at a predetermined value, while supporting a patient, a distance from a closest point on the top face to the bottom face of the chamber.

13. The apparatus of claim 12, wherein said control means comprise a control station comprising a central processing unit having a memory, the central processing unit continuously or intermittently receiving signals proportional to the value of the position of the closest point between the top face and the bottom face, as transmitted by the measuring device and comparing the values of the distance of the closest point from the bottom face with a reference value, said control station controlling the means for servo controlling the inflation pressure of the chamber to obtain a distance between the closest point of the top face from the bottom face essentially constantly equal to the reference value.

14. The apparatus according to claim 1 wherein the central layer includes a thin metal foil.

15. A method of treating a bedsore or preventing or lowering a risk of occurrence of a bedsore of a patient lying on a mattress, said method comprising:
    providing a mattress comprising at least one closed or controlled release chamber, said chamber being flexible and inflatable at an adjustable, predetermined initial inflation pressure, said chamber having a top face for supporting a patient and a bottom face;
    providing a measurement device comprising a flexible film linked to the top face of said chamber and cooperating with at least one impedance varying element linked to the bottom face of said chamber, said flexible film comprising;
        an electrically conductive, active central layer having a coefficient of elasticity, a flexibility and two main faces of large area, a first face and a second face;
        at least one support layer of a synthetic material that is electrically insulating, and that has a coefficient of elasticity substantially similar to the coefficient of elasticity of the active central layer, said support layer being linked to the first face of said central layer; and
        at least one protective second layer made of an electrically insulating synthetic material, the protective layer being linked to the second face of said central layer, a total thickness of the film being predetermined to substantially retain the flexibility of the central layer; and
    maintaining a distance of a closest point on the flexible film from the bottom face of the chamber at a predetermined value which is substantially equal to a reference distance.

16. The method of claim 15, further comprising providing control means and servo control means, said control means acting on said servo control means for servo controlling an inflation pressure of the chamber to maintain the distance of the closest point on the flexible film from the bottom face of the chamber at the reference distance while a patient is supported on said mattress.

17. The method of claim 16, wherein said control means further comprise a control station comprising a central processing unit having a memory, the central processing unit continuously or intermittently receiving signals proportional to the value of the distance of the closest point on the foil from the bottom face of the chamber transmitted by said measurement device and comparing the distance of the closest point on the foil from the bottom face with the reference distance.

18. The method of claim 15, wherein a thickness of the central layer is between about 15 μm and 40 μm.

19. The method of claim 15, wherein a thickness of the support layer is between about 10 μm and 15 μm.

20. The method of claim 15, wherein the support layer comprises polyester.

21. The method of claim 15, wherein the support layer comprises metal plating on at least one face facing the central layer.

22. The method of claim 21, wherein the metal plating of the support layer comprises a metal or a metal alloy compatible with a metal of the central layer.

23. The method of claim 15, wherein the central layer comprises a flexible film of foil made of aluminum or of an aluminum alloy, and the support layer comprises a metal plating formed of a metal or a metal alloy selected from the group consisting of silver, aluminum and a combination of silver and aluminum.

24. The method of claim 15, wherein a thickness of the protective layer is between about 20 μm and 40 μm.

25. The method of claim 15, wherein the protective layer comprises polyester.

26. The method of claim 18, wherein said central layer is linked with said support layer and said protective layer with an adhesive having a bonding force of a high mechanical strength and an adhesion capacity that impedes unsticking of the multi-layer product without tearing the central layer.

27. The method of claim 26, wherein said adhesive is an acrylic adhesive.

28. The method of claim 15, wherein the central layer includes a thin metal foil.

29. A flexible film movable and deformable in space, said flexible film, comprising:

an electrically conductive, flexible, active central layer having a coefficient of elasticity, a flexibility, and two main faces of large area, a first face and a second face;

at least one support layer of a synthetic material that is electrically insulating, and that has a coefficient of elasticity substantially similar to the coefficient of elasticity of the central layer, the support layer being linked to the first face of the central layer; and at least one protective second layer made of an electrically insulating synthetic material, the second layer being linked to the second face of the central layer, the total thickness of the film being predetermined to retain substantially completely the flexibility of the active central layer, said central layer being of a size smaller than a size of the support layer and a size of the protective layer.

30. The flexible film of claim 29, wherein the size of the central layer is about 600 mm by 600 mm and the size of the support layer is about 1,100 mm to 1,400 mm by 725 mm to 915 mm and the size of the protective layer is about 1,000 mm by 700 mm.

31. The film of claim 29, wherein a thickness of the central layer is between about 15 μm and 40 μm.

32. The film of claim 29, wherein the thickness of the support layer is between about 10 μm and 15 μm.

33. The film of claim 29, wherein the support layer comprises polyester.

34. The film of claim 29, wherein the support layer comprises a metal plating over at least one face facing the central layer.

35. The film of claim 34, wherein the metal plating of the support layer comprises a metal or a metal alloy compatible with a metal of the central layer.

36. The film of claim 29, wherein the central layer comprises a flexible film of foil made of aluminum or of an aluminum alloy, and the support layer comprises a plating of a metal or a metal alloy selected from the group consisting of silver, aluminum and a combination of silver and aluminum.

37. The film of claim 29, wherein a thickness of the protective layer is between about 20 μm and 40 μm.

38. The film of claim 29, wherein the protective layer comprises polyester.

39. The film of claim 29, wherein said central layer is linked with said support layer and said protective layer with an adhesive having a bonding force of a high mechanical strength and an adhesion capacity that impedes unsticking of the multi-layer product without tearing the central layer.

40. The film of claim 39, wherein said adhesive is an acrylic adhesive.

41. The flexible film of claim 29 wherein the central layer includes a thin metal foil.

* * * * *

UNITED STATES PATENT AND TRADEMARK OFFICE
CERTIFICATE OF CORRECTION

PATENT NO. : 6,244,272 B1
DATED : June 12, 2001
INVENTOR(S) : Jean-Marc Montant and Jean-Luc Caminade It is certified that error appears in the above-identified patent and that said Letters Patent is hereby corrected as shown below:

<u>Title page,</u>
Item [73] should read as follows:

Assignee: Hill-Rom Industries S.A.

Signed and Sealed this

Ninth Day of October, 2001

Attest:

*Nicholas P. Godici*

NICHOLAS P. GODICI
*Acting Director of the United States Patent and Trademark Office*

*Attesting Officer*